United States Patent
Patil et al.

(10) Patent No.: US 8,468,528 B2
(45) Date of Patent: Jun. 18, 2013

(54) METHOD FOR SELECTIVE FLUSHING LOGS WITHIN MULTIPLE QUEUES CONCURRENTLY

(75) Inventors: Rahul Patil, Sammamish, WA (US);
Paul Ringseth, Bellevue, WA (US);
Philip Lucido, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 982 days.

(21) Appl. No.: 12/131,137

(22) Filed: Jun. 2, 2008

(65) Prior Publication Data

US 2009/0300628 A1 Dec. 3, 2009

(51) Int. Cl.
*G06F 9/46* (2006.01)
*G06F 11/00* (2006.01)

(52) U.S. Cl.
USPC ........... 718/101; 718/102; 714/38.11; 714/45

(58) Field of Classification Search
USPC .................. 713/1, 2; 714/38.11, 45; 718/101, 718/102
See application file for complete search history.

(56) References Cited

U.S. PATENT DOCUMENTS

| | | | | |
|---|---|---|---|---|
| 5,675,763 A | * | 10/1997 | Mogul | 711/135 |
| 5,819,066 A | * | 10/1998 | Bromberg et al. | 707/827 |
| 6,542,845 B1 | | 4/2003 | Grucci et al. | |
| 6,697,963 B1 | * | 2/2004 | Nouri et al. | 714/31 |
| 6,769,079 B1 | | 7/2004 | Currey et al. | |
| 7,213,175 B2 | | 5/2007 | Morrison et al. | |
| 2002/0165902 A1 | * | 11/2002 | Robb et al. | 709/202 |
| 2003/0037096 A1 | * | 2/2003 | Kao | 709/202 |
| 2003/0233389 A1 | | 12/2003 | Bradshaw et al. | |
| 2004/0128585 A1 | | 7/2004 | Hind et al. | |
| 2004/0167912 A1 | | 8/2004 | Tsui et al. | |
| 2004/0230961 A1 | * | 11/2004 | Biberstein et al. | 717/150 |
| 2005/0114731 A1 | | 5/2005 | Lomet et al. | |
| 2006/0224634 A1 | * | 10/2006 | Hahn et al. | 707/200 |
| 2007/0168967 A1 | | 7/2007 | Chopra et al. | |
| 2007/0177184 A1 | | 8/2007 | Boston et al. | |
| 2009/0217104 A1 | * | 8/2009 | Wilding et al. | 714/45 |

OTHER PUBLICATIONS

"Debugging Tool: Build a Logging and Event Viewing Library to Help Debug Your .NET Framework-based App", http://msdn.microsoft.com/msdnmag/issues/03/05/LoggingTool/.
"Visual Basic .Net: Tracing, Logging, and Threading Made Easy with .NET", http://msdn.microsoft.com/msdnmag/issues/01/07/vbnet/?topics=/msdnmag/issues/01/07/vbnet.
"Java Concurrency in Practice", http://safari.oreilly.com/0321349601/ch11lev1sec6.

\* cited by examiner

*Primary Examiner* — Chun Cao
*Assistant Examiner* — Terrell Johnson

(57) ABSTRACT

A logger in a process of a computer system creates a log queue for each execution context and/or processing resource in the process. A log is created in the log queue for each log request and log information associated with the log request is stored into the log. All logs in each log queue except for the most recently added log in each log queue are flushed prior to the process completing.

17 Claims, 5 Drawing Sheets

METHOD FOR SELECTIVE FLUSHING LOGS WITHIN MULTIPLE QUEUES CONCURRENTLY

BACKGROUND

In testing and performing diagnostics in a computer system, processes executing on the computer system may be logged to allow for debugging. A process is typically logged by providing information generated by the process to a location where it can be examined. The information provided at selected points in the execution of the process may be compared to expected information to detect discrepancies between the expected information and the logged information.

Computer systems may allow multiple execution contexts (e.g., threads, fibers, or child processes) of a process to be executed concurrently. With concurrent execution, various techniques may be used to make the logging concurrency safe to ensure that the desired information is produced when the process is logged. These techniques, however, may affect the throughput of the process in the computer system and may significantly alter the execution paths of the process in the computer system when the process is executed. The techniques may also hide races between different execution contexts of the process due to memory reordering.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A logger in a process of a computer system creates a log queue for each execution context and/or processing resource in the process. A log is created in the log queue for each log request and log information associated with the log request is stored into the log. All logs in each log queue except for the most recently added log in each log queue are flushed prior to the process completing.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown, by way of illustration, specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
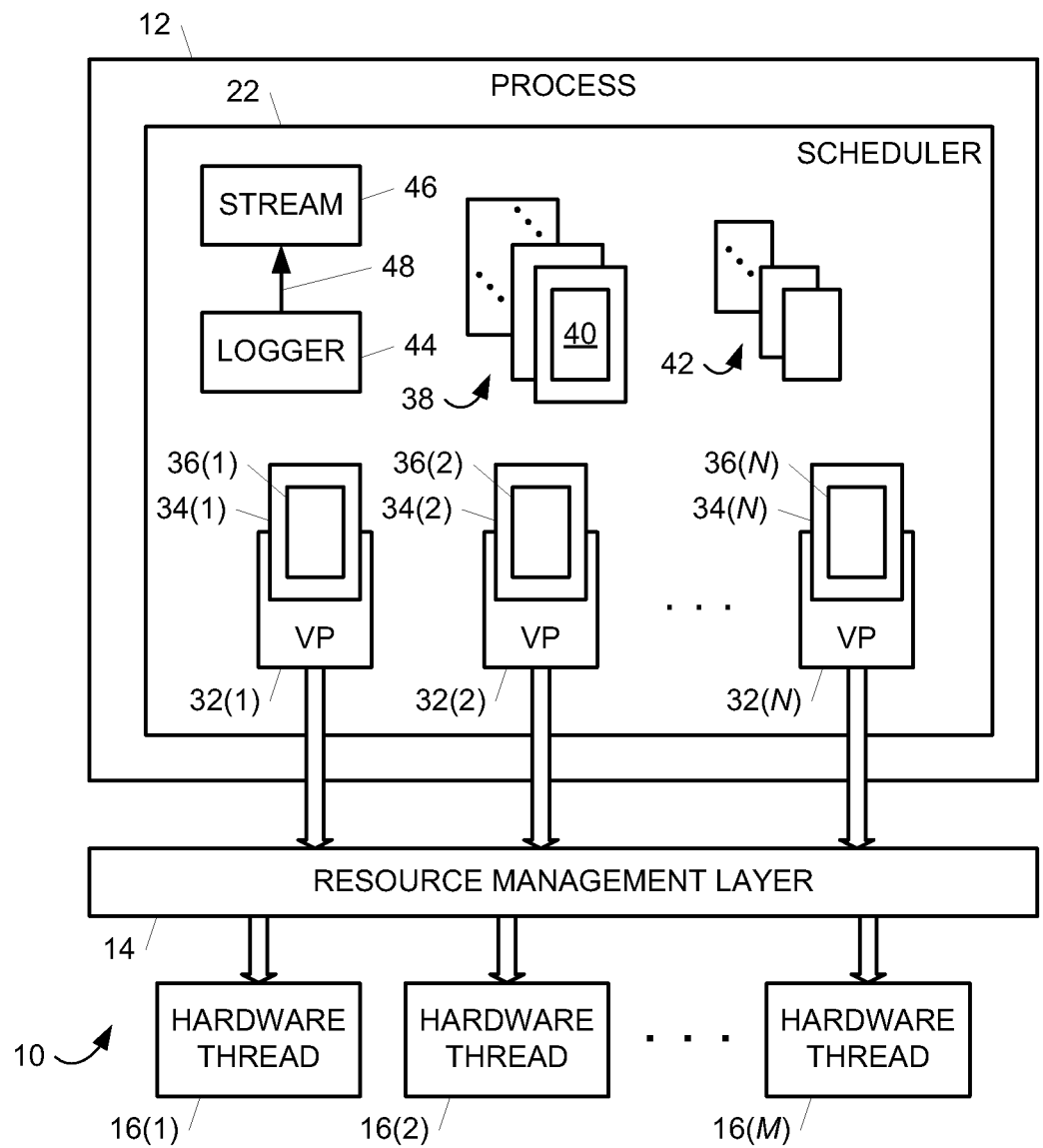
FIG. 1 is a block diagram illustrating an embodiment of a scheduler configured to operate in conjunction with a logger in a process.

FIG. 1 is a block diagram illustrating an embodiment of a scheduler 22 configured to operate in conjunction with a logger 44 in a process 12 of a runtime environment 10.

Runtime environment 10 represents a runtime mode of operation in a computer system, such as a computer system 100 shown in FIG. 6 and described in additional detail below, where the computer system is executing instructions. The computer system generates runtime environment 10 from a runtime platform such as a runtime platform 122 shown in FIG. 6 and described in additional detail below.

Runtime environment 10 includes an least one invoked process 12, a resource management layer 14, and a set of hardware threads 16(1)-16(M), where M is an integer that is greater than or equal to one and denotes the Mth hardware thread 16(M). Runtime environment 10 allows tasks from process 12 to be executed, along with tasks from any other processes that co-exist with process 12 (not shown), using resource management layer 14 and hardware threads 16(1)-16(M). Runtime environment 10 operates in conjunction resource management layer 14 to allow process 12 to obtain processor and other resources of the computer system (e.g., hardware threads 16(1)-16(M)).

Runtime environment 10 includes a scheduler function that generates scheduler 22. In one embodiment, the scheduler function is implemented as a scheduler application programming interface (API). In other embodiments, the scheduler function may be implemented using other suitable programming constructs. When invoked, the scheduler function creates scheduler 22 in process 12 where scheduler 22 operates to schedule tasks of process 12 for execution by one or more hardware threads 16(1)-16(M). Runtime environment 10 may exploit fine grained concurrency that application or library developers express in their programs (e.g., process 12) using accompanying tools that are aware of the facilities that the scheduler function provides.

Process 12 includes an allocation of processing and other resources that host one or more execution contexts (viz., threads, fibers, or child processes). Process 12 obtains access to the processing and other resources in the computer system (e.g., hardware threads 16(1)-16(M)) from resource management layer 14. Process 12 causes tasks to be executed using the processing and other resources.

Process 12 generates work in tasks of variable length where each task is associated with an execution context in scheduler 22. Each task includes a sequence of instructions that perform a unit of work when executed by the computer system. Each execution context forms a thread (or analogous OS concept such as child process) that executes associated tasks on allocated processing resources. Each execution context includes program state and machine state information. Execution contexts may terminate when there are no more tasks left to execute. For each task, runtime environment 10 and/or process 12 either assign the task to scheduler 22 to be scheduled for execution or otherwise cause the task to be executed without using scheduler 22.

Process 12 may be configured to operate in a computer system based on any suitable execution model, such as a stack model or an interpreter model, and may represent any suitable type of code, such as an application, a library function, or an operating system service. Process 12 has a program state and machine state associated with a set of allocated resources that include a defined memory address space. Process 12 executes autonomously or substantially autonomously from any co-existing processes in runtime environment 10. Accordingly, process 12 does not adversely alter the program state of co-existing processes or the machine state of any resources allocated to co-existing processes. Similarly, co-existing processes do not adversely alter the program state of process 12 or the machine state of any resources allocated to process 12.

Resource management layer 14 allocates processing resources to process 12 by assigning one or more hardware threads 16 to process 12. Resource management layer 14 exists separately from an operating system of the computer system (not shown in FIG. 1) in the embodiment of FIG. 1. In other embodiments, resource management layer 14 or some or all of the functions thereof may be included in the operating system.

Hardware threads 16 reside in execution cores of a set or one or more processor packages (e.g., processor packages 102 shown in FIG. 6 and described in additional detail below) of the computer system. Each hardware thread 16 is configured to execute instructions independently or substantially independently from the other execution cores and includes a machine state. Hardware threads 16 may be included in a single processor package or may be distributed across multiple processor packages. Each execution core in a processor package may include one or more hardware threads 16.

Process 12 implicitly or explicitly causes scheduler 22 to be created via the scheduler function provided by runtime environment 10. Scheduler instance 22 may be implicitly created when process 12 uses APIs available in the computer system or programming language features. In response to the API or programming language features, runtime environment 10 creates scheduler 22 with a default policy. To explicitly create a scheduler 22, process 12 may invoke the scheduler function provided by runtime environment 10 and specify one or more policies for scheduler 22.

Scheduler 22 interacts with resource management layer 14 to negotiate processing and other resources of the computer system in a manner that is transparent to process 12. Resource management layer 14 allocates hardware threads 16 to scheduler 22 based on supply and demand and any policies of scheduler 22.

In the embodiment shown in FIG. 1, scheduler 22 manages the processing resources by creating virtual processors 32 that form an abstraction of underlying hardware threads 16. Scheduler 22 includes a set of virtual processors 32(1)-32(N) where N is an integer greater than or equal to one and denotes the Nth virtual processor 32(N). Scheduler 22 multiplexes virtual processors 32 onto hardware threads 16 by mapping each virtual processor 32 to a hardware thread 16. Scheduler 22 may map more than one virtual processor 32 onto a particular hardware thread 16 but maps only one hardware thread 16 to each virtual processor 32. In other embodiments, scheduler 22 manages processing resources in other suitable ways to cause instructions of process 12 to be executed by hardware threads 16.

The set of execution contexts in scheduler 22 includes a set of execution contexts 34(1)-34(N) with respective, associated tasks 36(1)-36(N) that are being executed by respective virtual processors 32(1)-32(N) and, at any point during the execution of process 12, a set of zero or more execution contexts 38. Each execution context 34 and 38 includes state information that indicates whether an execution context 34 or 38 is executing, runnable (e.g., in response to becoming unblocked or added to scheduler 22), or blocked. Execution contexts 34 that are executing have been attached to a virtual processor 32 and are currently executing. Execution contexts 38 that are runnable include an associated task 40 and are ready to be executed by an available virtual processor 32. Execution contexts 38 that are blocked also include an associated task 40 and are waiting for data, a message, or an event that is being generated by another execution context 34 or will be generated by another execution context 38.

Each execution context 34 executing on a virtual processor 32 may generate, in the course of its execution, additional tasks 42, which are organized in any suitable way (e.g., added to work queues (not shown in FIG. 1)). Work may be created by using either application programming interfaces (APIs) provided by runtime environment 10 or programming language features and corresponding tools in one embodiment. When processing resources are available to scheduler 22, tasks are assigned to execution contexts 34 or 38 that execute them to completion or a blocking point (e.g. waiting for a message or a stolen child task to complete) on virtual processors 32 before picking up new tasks. When a task unblocks, the task is re-scheduled to execute on an available virtual processor, possibly with priority given to choosing a virtual processor 32 on the hardware thread 16 where it executed before blocking, in the hope that the memory hierarchy (viz., cache hierarchy) already contains data that can be optimally reused. An execution context 34 executing on a virtual processor 32 may also unblock other execution contexts 38 by generating data, a message, or an event that will be used by other execution contexts 38.

Figure 2:
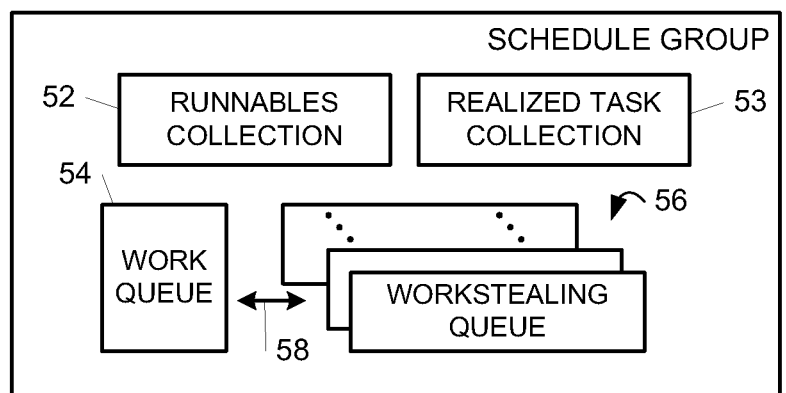
FIG. 2 is a block diagram illustrating an embodiment of a scheduling group for use in a scheduler.

Each task in scheduler 22 may be realized (e.g., realized tasks 36 and 40), which indicates that an execution context 34 or 38 has been or will be attached to the task and the task is ready to execute. Realized tasks typically include unblocked execution contexts and scheduled agents. A task that is not realized is termed unrealized. Unrealized tasks (e.g., tasks 42) may be created as child tasks generated by the execution of parent tasks and may be generated by parallel constructs (e.g., parallel, parallel for, begin, and finish). Scheduler 22 may be organized into a synchronized collection (e.g., a stack and/or a queue) for logically independent tasks with execution contexts (i.e., realized tasks) along with a list of workstealing queues for dependent tasks (i.e., unrealized tasks) as illustrated in the embodiment of FIG. 2 described below.

Upon completion, blocking, or other interruption (e.g., explicit yielding or forced preemption) of a task 36 associated with an execution context 34 running on a virtual processor 32, the virtual processor 32 becomes available to execute another realized task 40 or unrealized task 42. Scheduler 22 searches for a runnable execution context 38 or an unrealized task 42 to attach to the available virtual processor 32 for execution in any suitable way. For example, scheduler 22 may first search for a runnable execution context 38 to execute before searching for an unrealized task 42 to execute. Scheduler 22 continues attaching execution contexts 38 to available virtual processors 32 for execution until all execution contexts 38 of scheduler 22 have been executed.

In one embodiment, process 12 organizes tasks into one or more schedule groups 50 and presents schedule groups 50 to scheduler 22. FIG. 2 is a block diagram illustrating an embodiment of a schedule group 50 for use in scheduler 22.

Schedule group 50 includes a runnables collection 52, a realized task collection 53, a work collection 54, and a set of zero or more worksteling queues 56. Runnables collection 52 contains a list of unblocked execution contexts 38. Scheduler 22 adds an execution context 38 to runnables collections 52 when an execution context becomes unblocked. Realized task collection 53 contains a list of realized tasks 40 (e.g., unstarted agents) that may or may not have associated execution contexts 38. Scheduler 22 adds a realized task to realized task collection 53 when a new runnable task is presented to scheduler 22 by process 12. Work queue 54 contains a list of workstealing queues 56 as indicated by an arrow 58 and tracks the execution contexts 34 that are executing tasks from the workstealing queues 56. Each workstealing queue 56 includes one or more unrealized tasks 42.

Using the embodiment of FIG. 2, scheduler 22 may first search for unblocked execution contexts 38 in the runnables collection 52 of all schedule groups 50 in scheduler 22. Scheduler 22 may then search for realized tasks in the realized task collection 53 of all schedule groups 50 in scheduler 22 before searching for unrealized tasks in the workstealing queues 56 of the schedule groups 50.

In one embodiment, a virtual processor 32 that becomes available may attempt to locate a runnable execution context 38 in the runnables collection 52 or a realized task 40 in the realized task collection 53 in the schedule group 50 from which the available virtual processor 32 most recently obtained a runnable execution context 38 (i.e., the current schedule group 50). The available virtual processor 32 may then attempt to locate a runnable execution context 38 in the runnables collections 52 or a realized task 40 in the realized task collection 53 in the remaining schedule groups 50 of scheduler 22 in a round-robin or other suitable order. If no runnable execution context 38 is found, then the available virtual processor 32 may then attempt to locate an unrealized task 42 in the workstealing queues 56 of the current schedule group 50 before searching the workstealing queues 56 in the remaining schedule groups 50 of scheduler 22 in a round-robin or other suitable order.

Figure 6:
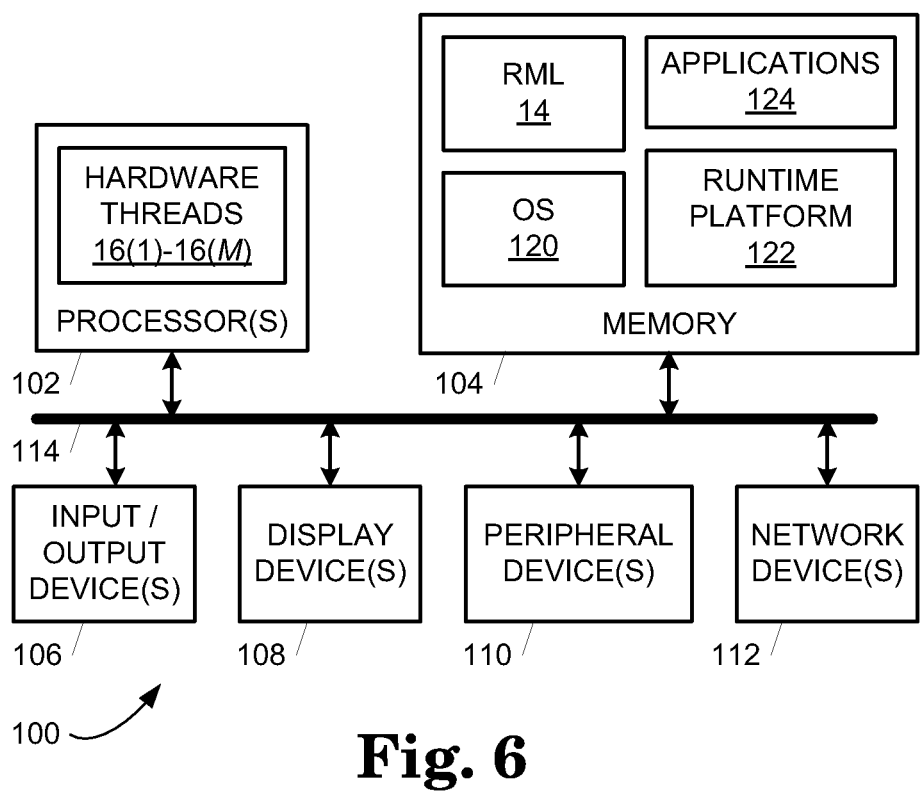
FIG. 6 is a block diagram illustrating an embodiment of a computer system configured to implement a runtime environment including a scheduler configured to operate in conjunction with a logger.

Prior to executing tasks, scheduler 22 obtains execution contexts 34 and 38 from runtime environment 10 or an operating system (e.g., OS 120 of FIG. 6). Available virtual processors 32 locate and execute execution contexts 34 to begin executing tasks. Virtual processors 32 become available again in response to an execution context 34 completing, blocking, or otherwise being interrupted. When virtual processors 32 become available, virtual processors 32 switch to a runnable execution context 38 or execute a next task 40 or 42 as a continuation on a current execution context 34 if the previous task 36 executed by the current execution context 34 completed.

Referring back to FIG. 1, in one embodiment, scheduler 22 is configured to operate in conjunction with logger 44. Logger 44 includes a set of instructions executable by the computer system to cause log information to be provided to a stream 46 as indicated by an arrow 48 for testing, diagnostic, and/or other suitable purposes. Stream 46 may represent any suitable output destination for storing or displaying log information such as a console, a file, or a network. In one embodiment, logger 44 is implemented as a daemon that operates to detect log requests from tasks 36 executing on processing resources of scheduler 22 and cause the log information to be provided to stream 46. In other embodiments, logger 44 may be implemented using other suitable programming constructs to accomplish the functionality described herein.

Figure 3:
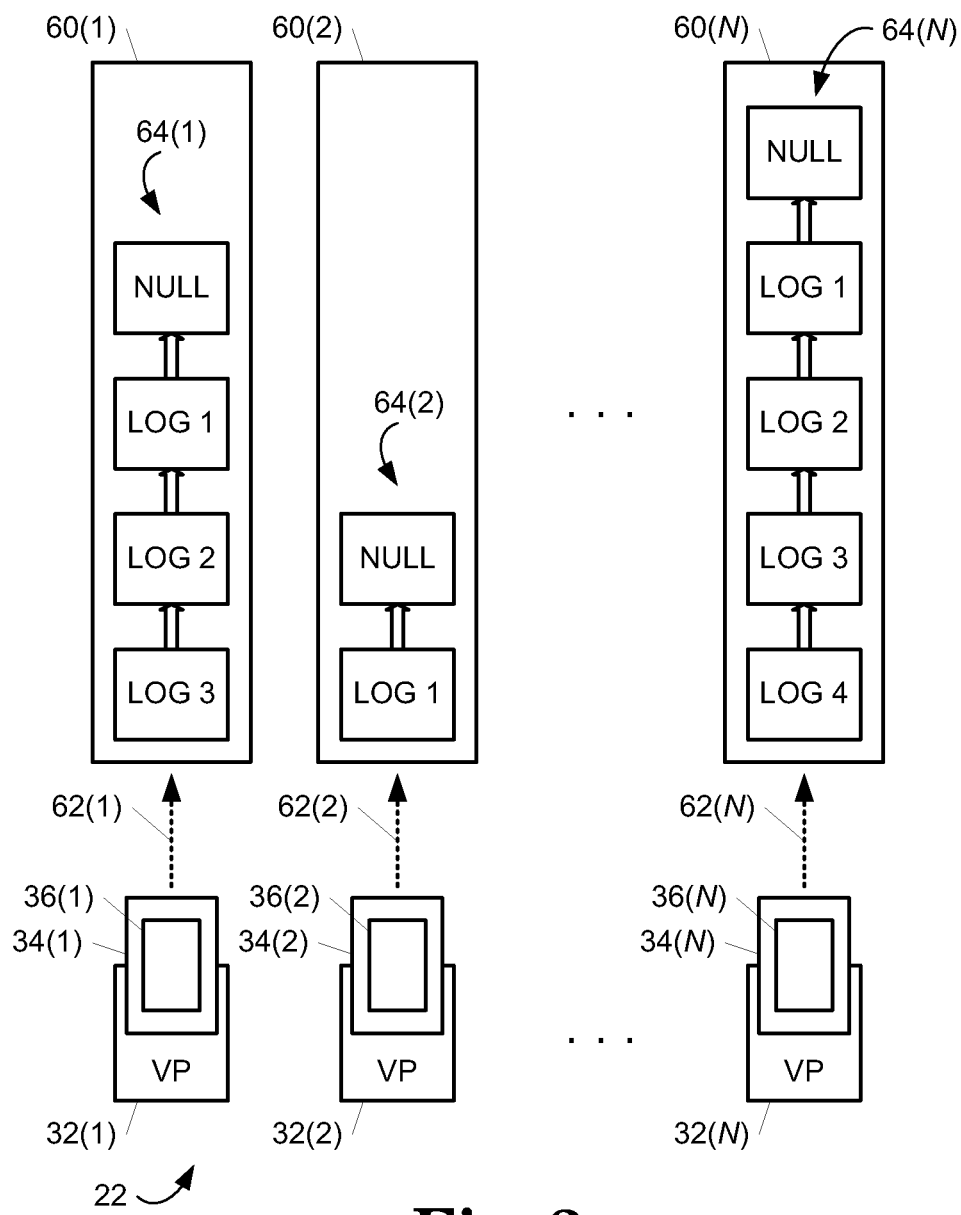
FIG. 3 is a block diagram illustrating an embodiment of log queues in a process.

Logger 44 creates data structures that are safe to operate with concurrent scheduling of execution contexts by scheduler 22 as shown in the embodiment of FIG. 3. FIG. 3 is a block diagram illustrating an embodiment of log queues 60(1)-60(N) in process 12 where N is an integer that specifies the number of concurrent writers to log queues 60(1)-60(N) and denotes the Nth log queue 60(N). In one embodiment, N is equal to the number of virtual processors 32. In another embodiment, N is equal to the maximum number of concurrently executing execution contexts 34 and 38.

Log queues 60(1)-60(N) includes respective sets of zero or more logs 64(1)-64(N) where each set 64(1)-64(N) is configured as a linked list of logs 64 by logger 44. Each log 64 forms a node that stores logging information generated by a task 36 executing on an execution context 34 on a virtual processor 32. Logger 44 initializes each log queue 60(1)-60(N) to include a null log as the initial head log of the linked list.

Log queues 60(1)-60(N) correspond to either respective virtual processors 32(1)-32(N) or respective execution contexts 34(1)-34(N) as indicated by respective arrows 62(1)-62(N).

In one embodiment, logger 44 creates a log queue 60 for each virtual processor 32 and causes all log information generated by tasks 36 executing on a virtual processor 32 to be stored in logs 64 corresponding to the log queue 60 for the virtual processor 32. Logger 44 may selectively create log queues 60 for virtual processors 32 that execute log requests in tasks 36 or may create log queues 60 for all virtual processors 32. Where logger 44 creates log queues 60 for all virtual processors 32, logger 44 may create a log queue 60 each time a corresponding virtual processor 32 is added to scheduler 22 and may delete a log queue 60 each time a corresponding virtual processor 32 is removed from scheduler 22. Log queues 60(1)-60(N) for respective virtual processors 32(1)-32(N) may remain throughout the execution of process 12 or may be deleted subsequent to completing log requests.

In another embodiment, logger 44 creates a log queue 60 for each execution context 34 and causes all log information generated by a task 36 executing on an execution context 34 to be stored in logs 64 corresponding to the log queue 60 for the execution context 34. Logger 44 may selectively create log queues 60 for execution contexts 34 that execute log requests in tasks 36 or may create log queues 60 for all execution contexts 34. Where logger 44 creates log queues 60 for all execution contexts 34, logger 44 may create a log queue 60 each time a corresponding execution context 34 is attached to a virtual processor 32 and may delete a log queue 60 each time a corresponding execution context 34 completes, blocks or is interrupted on a virtual processor 32. Each log queues 60 may be stored as part of an execution context switch when a corresponding execution context 34 blocks or is interrupted and may be restored when the corresponding execution context 34 resumes. Each log queue 60 may be flushed and deleted in response to a corresponding execution context 34 completing or otherwise being retired.

Figure 4:
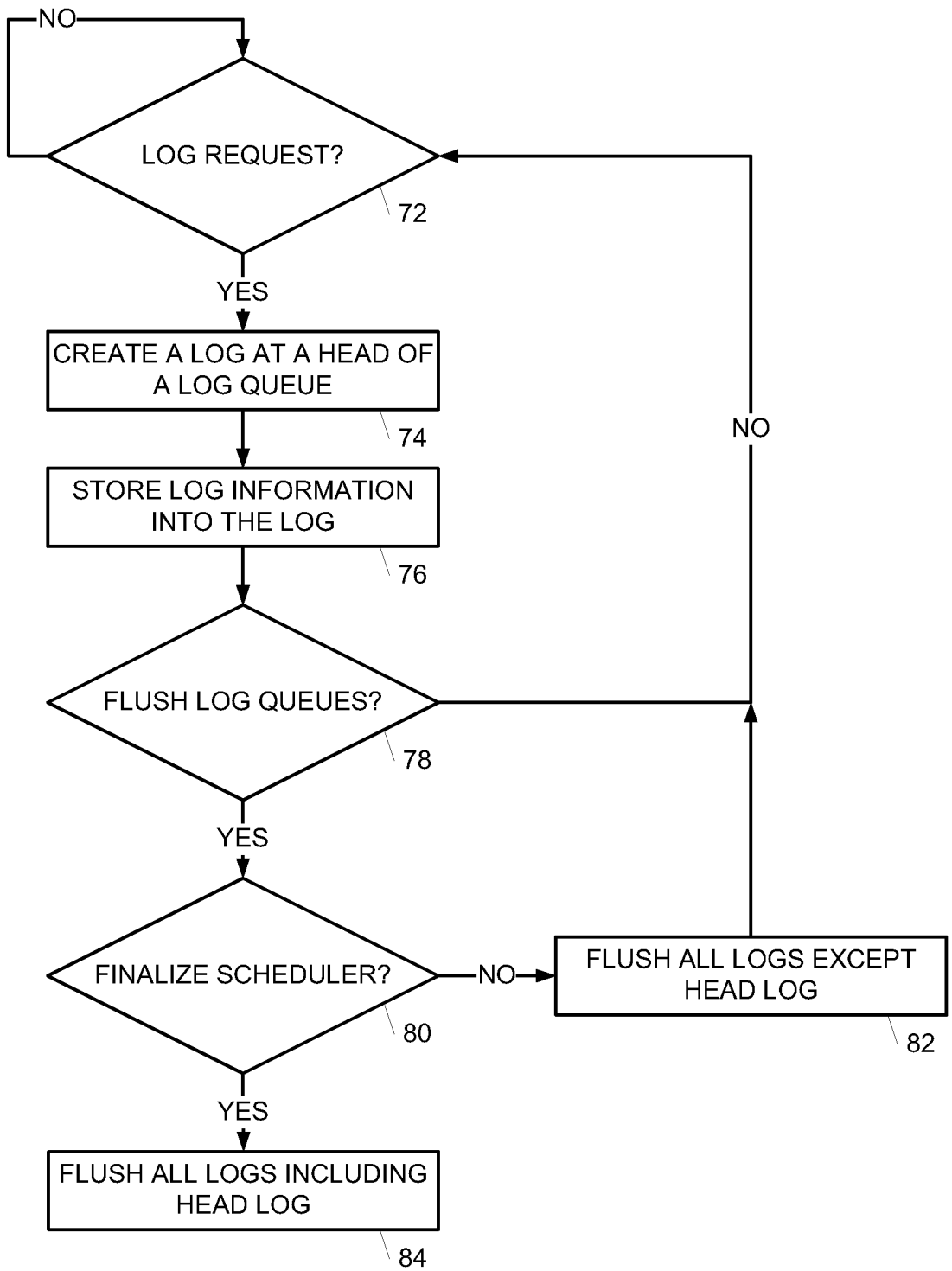
FIG. 4 is a flow chart illustrating an embodiment of a method for logging information with log queues.
Figure 5A:
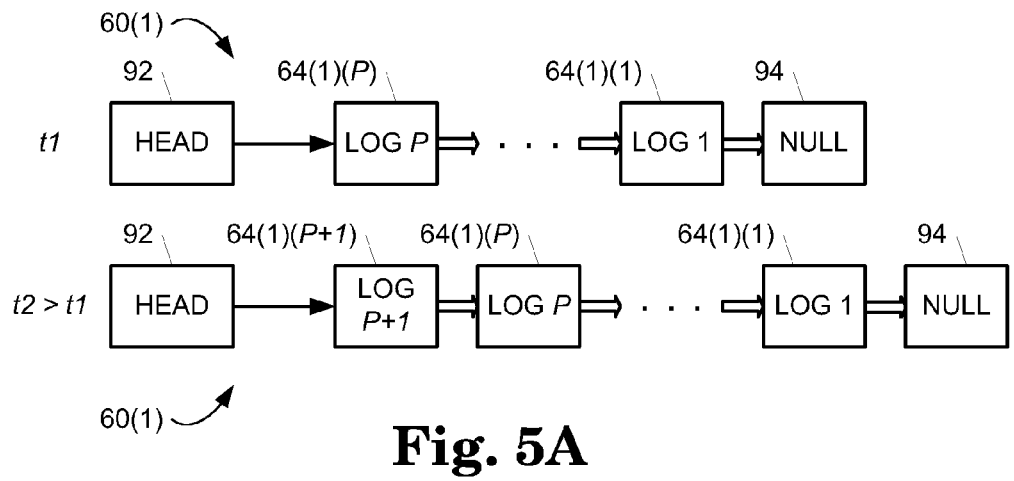
FIGS. 5A-5B are block diagrams illustrating embodiments of the use of log queues in a process.
Figure 5B:
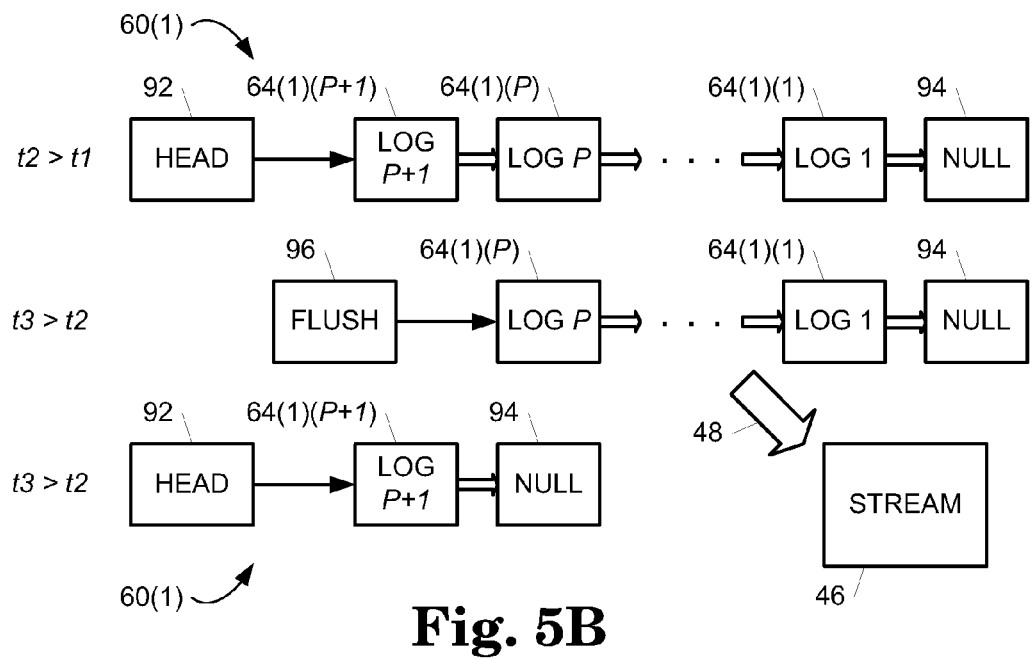

FIG. 4 is a flow chart illustrating an embodiment of a method for logging information with log queues 60. The method of FIG. 4 will be described with reference to the embodiments of FIG. 3 and FIGS. 5A-5B. FIGS. 5A-5B are block diagrams illustrating embodiments of the use of log queues in process 12.

In FIG. 4, a determination is made by logger 44 as to whether a log request has been detected as indicated in a block 72. Each time that logger 44 detects a log request, logger 44 creates a log 64 at a head of a log queue 60 corresponding to the execution context 34 and/or the virtual processor 32 that executed the log request as indicated in a block 74. For example, logger 44 adds a new head log 64 in the set of logs 64(1) in log queue 60(1) for each a log request executed by task 36(1) on execution context 34(1) on virtual processor 32(1). Similarly, logger 44 adds a new head log 64 in the set of logs 64(2) in log queue 60(2) for each a log request executed by task 36(2) on execution context 34(2) on virtual processor 32(2) and so on. Each time logger 44 adds a new head log 64 into a set of logs 64, logger 44 converts the previous head log 64 into a head-next log 64.

Subsequent to a new head log 64 being created, an execution context 34 executing on a virtual processor 32 causes log information to be stored into the new head log 64 in the log queue 60 corresponding to the execution context 34 and/or virtual processor 32 as indicated in a block 76. Logger 44 causes a logging function associated with a logging request to be executed on execution context 34 that executed the task 36 that included the logging request. In response to executing the logging function, the execution context 34 causes log information generated by one or more tasks 36 executing on the execution context 34 to be stored in the most recently added log 64 in the corresponding log queue 60. The logging function may include any suitable synchronization information (e.g., time information) to be included in the log information stored into the new head log 64. By causing log information to be stored to only the current head log 64 in each log queue 60, logger 44 ensures that execution contexts 34 of process 12 do not access logs 64 other than the head log 64 in each log queue 60.

Referring to the example of FIG. 5A, a log queue 60(1) at a time t1 includes log 64(1)(1) to log 64(1)(P) where P is an integer greater than or equal to two and denotes the Pth log 64(1)(P). At time t1, log 64(1)(P) represents the head log of log queue 60(1) as indicated by a head pointer 92 and log 64(1)(1) represents the tail log of log queue 60(1) as indicated by a null pointer 94. At time t2 which is subsequent to time t1, logger 44 creates a new head log 64(1)(P+1) in response to a log request and enques the new head log 64(1)(P+1) to log queue 60 by causing new head log 64(1)(P+1) to point to the previous head log 64(1)(P) and head pointer 92 to point to new head log 64(1)(P+1). Log information associated with the log request is stored in new head log 64(1)(P+1).

Periodically, a determination is made by logger 44 as to whether to flush one or more log queues 60 as indicated in a block 78. As used herein, the term flush refers to safely removing one or more logs 64 from one or more log queues 60 and outputting the log or logs 64 into stream 46. The determination may be triggered by a timer (e.g., every few seconds), an amount of data collected in a logs queue 60 since it was last flushed, a total amount of data logged since the last flush, or in response to an external event such as a pending power down. When logger 44 decides to flush one or more log queues 60, logger 44 also determines whether scheduler 22 is being finalized as indicated in a block 80. If scheduler 22 is not being finalized, then logger 44 flushes all logs 64 except the head log 64 (i.e., the most recently added log 64) of one or more log queues 60 into stream 46 as indicated in a block 82. Logger 44 performs the flush prior to process 12 completing.

If scheduler 22 is being finalized, then logger 44 flushes all logs 64 including the head log 64 of each log queue 60 into stream 46 as indicated in a block 84.

Logger 44 does not flush the head log 64 of log queues 60 until scheduler 22 is being finalized. By doing so, logger 44 inherently avoids a race between a logging function and a flushing function. As a result, logging information may be safely stored into the head log 64 at any time and all but head logs 64 may be safely flushed at any time. At finalization of scheduler 22, logger 44 may ensure that all logging functions have been completed before performing the final flush of all logs 64 into stream 46.

Referring to the example of FIG. 5B, logger 44 flushes log queue 60(1) at a time t3 which is subsequent to time t2 of FIG. 5A. To do so, logger 44 dequeues logs 64(1)(1) through 64(1)(P) (i.e., log 1 to log P) by causing a flush pointer 96 to point to log 64(1)(P) and providing logs 64(1)(1) through 64(1)(P) to stream 46 as indicated by arrow 48. Contemporaneous with flushing logs 64(1)(1) through 64(1)(P), logger 44 causes head log 64(1)(P+1) to also become the tail log by pointing to null log 94. Any log information associated with the log request that created head log 64(1)(P+1) continues to be stored in head log 64(1)(P+1). If scheduler 22 is being finalized, logger 44 dequeues log 64(1)(P+1) and any logs 64 added subsequent to log 64(1)(P+1) by flushing log 64(1)(P+1) and any subsequent logs 64 into stream 46.

Subsequent to flushing logs 64 into stream 46, logger 44 may order logs 64 from all log queues 60 in stream 46 chronologically using the synchronization information stored with each log 64.

FIG. 6 is a block diagram illustrating an embodiment of computer system 100 which is configured to implement runtime environment 10 including scheduler 22 configured to operate in conjunction with logger 44 as described above.

Computer system 100 includes one or more processor packages 102, a memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 include hardware threads 16(1)-16(M). Each hardware thread 16 in processor packages 102 is configured to access and execute instructions stored in memory system 104. The instructions may include a basic input output system (BIOS) or firmware (not shown), an operating system (OS) 120, a runtime platform 122, applications 124, and resource management layer 14 (also shown in FIG. 1). Each hardware thread 16 may execute the instructions in conjunction with or in response to information received from input/output devices 106, display devices 108, peripheral devices 110, and/or network devices 112.

Computer system 100 boots and executes OS 120. OS 120 includes instructions executable by hardware threads 16 to manage the components of computer system 100 and provide a set of functions that allow applications 124 to access and use the components. In one embodiment, OS 120 is the Windows operating system. In other embodiments, OS 120 is another operating system suitable for use with computer system 100.

Resource management layer 14 includes instructions that are executable in conjunction with OS 120 to allocate resources of computer system 100 including hardware threads 16 as described above with reference to FIG. 1. Resource management layer 14 may be included in computer system 100 as a library of functions available to one or more applications 124 or as an integrated part of OS 120.

Runtime platform 122 includes instructions that are executable in conjunction with OS 120 and resource management layer 14 to generate runtime environment 10 and provide runtime functions to applications 124. These runtime functions include a scheduler function as described in additional detail above with reference to FIG. 1. The runtime functions may be included in computer system 100 as part of an application 124, as a library of functions available to one or more applications 124, or as an integrated part of OS 120 and/or resource management layer 14.

Each application 124 includes instructions that are executable in conjunction with OS 120, resource management layer 14, and/or runtime platform 122 to cause desired operations to be performed by computer system 100. Each application 124 represents one or more processes, such as process 12 as described above, that may execute with scheduler 22 as provided by runtime platform 122.

Memory system 104 includes any suitable type, number, and configuration of volatile or non-volatile storage devices configured to store instructions and data. The storage devices of memory system 104 represent computer readable storage media that store computer-executable instructions including OS 120, resource management layer 14, runtime platform 122, and applications 124. The instructions are executable by computer system to perform the functions and methods of OS 120, resource management layer 14, runtime platform 122, and applications 124 described herein. Examples of storage devices in memory system 104 include hard disk drives, random access memory (RAM), read only memory (ROM), flash memory drives and cards, and magnetic and optical disks.

Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

The above embodiments may advantageously allow for concurrency safe logging and flushing with minimal or no synchronization primitives to result in a high-throughput, non-intrusive logger. Accordingly, the above embodiments may allow logging to be performed in a concurrent execution environment without locks and without using of interlocked exchanges—i.e., without explicit synchronization through locks, fences, or barriers. In addition, the above embodiments may avoid contentions and races in a multi-threaded environment. The above embodiments may also allow for high throughput suitable for testing, diagnostic, and other suitable purposes in a concurrent execution environment. The above embodiments may further provide a general technique for instrumentation of concurrent code for profiling and debugging.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a process executing on a computer system, the method comprising:
    storing first log information for at least one of testing, diagnostics, profiling, and debugging, the first log information generated by a first execution context executing on a first processing resource into a first head log of a first plurality of logs of a first log queue associated with the first execution context to ensure that execution contexts of the process do not access the first plurality of logs other than the first head log in the first log queue;
    storing second log information for at least one of testing, diagnostics, profiling, and debugging, the second log information generated by a second execution context executing on a second processing resource into a second head log of a second plurality of logs of a second log queue associated with the second execution context to ensure that execution contexts of the process do not access the second plurality of logs other than the second head log in the second log queue;
    flushing each of the first plurality of logs of the first log queue except for the first head log of the first plurality of logs into a stream; and
    flushing each of the second plurality of logs of the second log queue except for the second head log of the second plurality of logs into the stream.

2. The method of claim 1 further comprising:
    storing the first log information in response to executing a first log request with the first execution context on the first processing resource; and
    storing the second log information in response to executing a second log request with the second execution context on the second processing resource.

3. The method of claim 2 further comprising:
scheduling a first task that includes the first log request for execution on the first execution context by the first processing resource with a scheduler in the process; and
scheduling a second task that includes the second log request for execution on the second execution context by the second processing resource with a scheduler in the process.

4. The method of claim 3 further comprising:
allocating the first and the second processing resources to the scheduler.

5. The method of claim 1 further comprising:
configuring the first plurality of logs of the first log queue into a first linked list; and
configuring the second plurality of logs of the second log queue into a second linked list.

6. The method of claim 1 further comprising:
ordering each of the first plurality of logs and each of the second plurality of logs in the stream chronologically.

7. The method of claim 1 wherein the first processing resource includes a first virtual processor, and wherein the second processing resource includes a second virtual processor.

8. A computer readable storage device storing computer-executable instructions that, when executed by a computer system, perform a method in a process executing on the computer system, the method comprising:
executing a first log request on a first execution context on a first processing resource allocated to the process;
adding a first log for at least one of testing, diagnostics, profiling, and debugging, the first log associated with the first log request into a first head log of a first plurality of logs of a first log queue corresponding to the first processing resource to ensure that execution contexts of the process do not access the first plurality of logs other than the first head log in the first log queue;
executing a second log request on a second execution context on a second processing resource allocated to the process; and
adding a second log for at least one of testing, diagnostics, profiling, and debugging, the second log associated with the second log request into a second head log of a second plurality of logs of a second log queue corresponding to the second processing resource to ensure that execution contexts of the process do not access the second plurality of logs other than the second head log in the second log queue;
flushing the first plurality of logs of the first log queue except the first head log into a stream; and
flushing the second plurality of logs of the second log queue except the second head log into the stream.

9. The computer readable storage device of claim 8, the method further comprising:
storing first log information generated in response to executing the first log request on the first execution context into the first log; and
storing second log information generated in response to executing the second log request on the second execution context into the second log.

10. The computer readable storage device of claim 8, the method further comprising:
adding the first log into the first head log in a first linked list of the first plurality of logs in the first log queue;
adding the second log into the first head log of a second linked list of the second plurality of logs in the second log queue.

11. The computer readable storage device of claim 8, the method further comprising:
executing a third log request on the first execution context on the first processing resource;
adding a third log associated with the third log request into the first log queue as the first head log; and
converting the first log into a first head-next log in the first linked list.

12. The computer readable storage device of claim 11, the method further comprising:
executing a fourth log request on the second execution context on the second processing resource;
adding a fourth log associated with the fourth log request into the second log queue as the second head log; and
converting the second log into a second head-next log in the second linked list.

13. A method performed by a process executing on a computer system comprising:
for each of a plurality of processing resources allocated to the process:
creating a log queue having a plurality of logs, each respective one of the plurality of logs including respective log information associated with a respective log request, the log information for at least one of testing, diagnostics, profiling, and debugging;
storing the respective log information into a head log of the plurality of logs in response to the respective log request; and
periodically flushing all of the plurality of logs in the log queue, except for the head log to avoid a race condition between the logging and the flushing, into a stream for the at least one of testing, diagnostics, profiling, and debugging prior to the process completing.

14. The method of claim 13 further comprising:
for each of the plurality of processing resources allocated to the process:
detecting the respective log requests; and
creating a respective one of the plurality of logs for each of the respective log requests.

15. The method of claim 13 further comprising:
for each of the plurality of processing resources allocated to the process:
including respective synchronization information in respective ones of the plurality of logs.

16. The method of claim 15 further comprising:
ordering each log in the stream chronologically using the synchronization information of each of the logs in the stream.

17. The method of claim 13 wherein each of the plurality of processing resources includes a respective virtual processor.

* * * * *